Feb. 27, 1951

H. O. PETERSON
DIVERSITY RECEIVER FOR MULTIPLEX
FREQUENCY SHIFT TONES 2,543,256

Filed May 20, 1948

3 Sheets-Sheet 1

INVENTOR
HAROLD O. PETERSON
BY Harry Tunick
ATTORNEY

Feb. 27, 1951

H. O. PETERSON
DIVERSITY RECEIVER FOR MULTIPLEX FREQUENCY SHIFT TONES 2,543,256

Filed May 20, 1948

3 Sheets-Sheet 2

INVENTOR
HAROLD O. PETERSON
BY [signature]
ATTORNEY

Feb. 27, 1951 H. O. PETERSON 2,543,256

DIVERSITY RECEIVER FOR MULTIPLEX FREQUENCY SHIFT TONES

Filed May 20, 1948 3 Sheets-Sheet 3

INVENTOR
HAROLD O. PETERSON
BY Sarry Tunick
ATTORNEY

Patented Feb. 27, 1951 2,543,256

UNITED STATES PATENT OFFICE 2,543,256

DIVERSITY RECEIVER FOR MULTIPLEX FREQUENCY SHIFT TONES

Harold O. Peterson, Riverhead, N. Y., assignor to Radio Corporation of America, a corporation of Delaware Application May 20, 1948, Serial No. 28,254

10 Claims. (Cl. 250—8)

This application relates to diversity receiver systems in general, and in particular to receivers of telegraph or Teletype signals or facsimile signals or the like. Telegraphy, Teletype or facsimile signals may be of the "on-off" type but are preferably of the frequency shifted type and in describing my invention, reference will be made to systems wherein the signals are represented by frequency shifted currents of tone frequency, the latter being used to amplitude or phase modulate a carrier of higher frequency for transmission purposes.

It is well known that fading effects at different points and in antennas of different character at the same point are different so that the same signal at one of said antennas may be better than at the other antenna, and I make use of such diversification in order that better signals may be obtained in the receiver output. In this respect, my system has much in common with the two-set space diversity system with fast acting channel selecting means shown in Schock et al. application Serial #632,978, filed December 5, 1945, now Patent No. 2,515,668, granted July 18, 1950.

In some cases, radio telegraphy signals and the like are transmitted over radio telephone channels. The radio telephone channels are of about 6,000 cycles width and the on-off telegraph channels each require a band of frequencies of about 2,500 cycles wide and under the best conditions only two on-off telegraphy channels can be set up over one radio telephone channel. It is of obvious importance to make the best use of the frequency spectrum and to this end, it has been found desirable to transmit radio printer channels by frequency shift modulation of tones transmitted over the radio telephone circuit in this multiplex system. The radio telephone circuit may operate on either single side band or double side band modulation methods and the transmitted carrier may be either phase or amplitude modulated by the frequency shifted tones. In the present application, it is assumed that the frequency shifted tones are used to amplitude or phase modulate the carrier and the carrier and one or both side bands are transmitted. At the receiver, the frequency shifted modulated tones are recovered and demodulated to derive the signal.

An object of the present invention is to provide an improved receiver adapted to receive and demodulate signals of the character described above. This system includes two receivers in a novel diversity system.

Distortion in signals results in large part from improper relation between the carrier and side band magnitudes in the demodulator and a further object of my invention is to provide a demodulation system for this type of transmission wherein the demodulator in each receiver is of the exalted carrier type. This object is attained by use of a novel gating system for selecting the best carrier picked up by the two receivers, which carrier is then used in the demodulators of both receivers. Thus, the best carrier is always available in the demodulators used for recovering the several tones.

The tones derived by the demodulators are then isolated and the best tone on each channel is selected by a signal strength sensing and detecting arrangement with a locking circuit controlled gating system. Thus, by the use of exalted carrier reception and diversification of each tone channel in the receiver outputs, the best possible quality of received signals results at all times.

In describing my invention in detail, reference will be made to the attached drawings, wherein Fig. 1 illustrates by circuit element and circuit element connections a diversity receiver system for multiplex tone signals on a carrier arranged in accordance with my invention. In this figure, for the sake of simplicity, rectangles are used to show the various components of the receiver. Where the circuit connections included in the rectangles need illustration, I have shown the same in separate figures.

Fig. 2 illustrates the essential features of a gating system operated by a locking circuit in turn controlled by a signal strength comparing and detecting circuit, the arrangement of the comparing and detecting circuit and locking circuit being as disclosed in said U. S. patent referred to above. The arrangement of Fig. 2 might replace the carrier selector of Figs. 1 and 4 or the audio channel selector of Figs. 1 and 4.

In Fig. 4, in order to operate the apparatus for selecting the best tone at higher frequency, I have included a frequency multiplier in each channel between the channel filter and diversity selector and a frequency divider between the limiter and filter in the common output.

Figure 1:
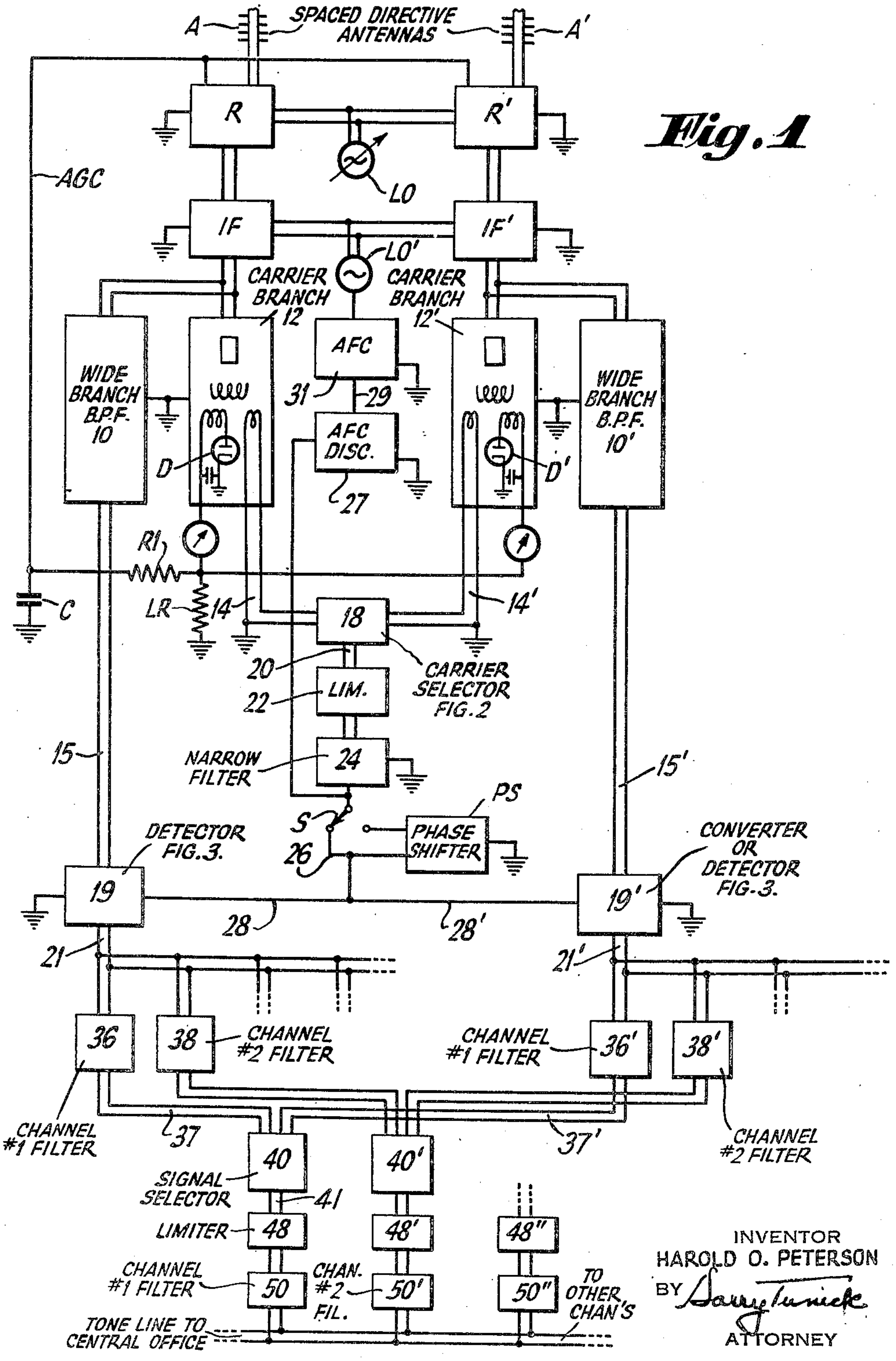

In Fig. 1, A and A' represent spaced antenna systems for intercepting radiant energy waves. The antenna systems may be directive and are in space diversity and supply current representing the radiant energy waves picked up to radio receivers R and R'. The receivers R and R' may each comprise a high frequency amplifier and converter with a local oscillator LO supplying the oscillatory energy for beating down the multiple modulated carried to some appropriate intermediate frequency. In the example given, it is assumed the intermediate frequency output of receivers R and R' is at 450 kc. These outputs are supplied to first intermediate frequency amplifier units IF and IF'. These intermediate frequency amplifiers comprise, in addition to circuits with the necessary selectivity and gain, a converter wherein the intermediate frequency energy is mixed with oscillatory energy from a second local oscillator LO' of a frequency such as to supply at the outputs of IF and IF' currents or voltages of low intermediate frequency which carry the multiplex signals. In the example given, the oscillator LO' is assumed to operate at 400 kc. per second in which case the second intermediate frequency outputs of IF and IF' are at 50 kc. The output of each of the first intermediate frequency stages IF and IF' is supplied to two branches one of which, 10 and 10', is designated the wide branch and the other of which, 12 and 12', is designated the narrow branch. In the wide branch, I include filters or band pass circuits of such a character as to pass without material attenuation the carrier and one or both side bands depending on whether double or single side band operation is to be carried out. This wide band branch supplies carrier and side band energy by leads 15 and 15' to demodulators 19 and 19'. These demodulators or detectors are of the frequency converter type and their outputs include the frequency shifted audio tones used as modulation on the carrier in the transmitter.

The narrow branches 12 and 12' include sharp or narrow band filters or tuned circuits having characteristics such that substantially the carrier only is extracted or passed and the side bands are materially reduced or removed so that substantially only carrier energy is supplied by lines 14 and 14' to the apparatus in the unit designated 18. This selector unit 18 comprises a carrier strength comparing and/or sensing detector arrangement, a locking circuit, a control tube connecting the detector output to the locking circuit, a pair of gating tubes and connections between the locking circuit output and the gating tubes such that the best carrier coming in on lines 14 and 14' is selected and supplied as output to the lines 20 for use in the demodulators of each receiver.

The carrier energy which is now an exalted carrier is then passed through the limiter 22 and a narrow filter 24 to remove therefrom any modulation frequencies introduced by the switching action in the limiter 22 and selector 18. This filtered carrier is supplied through leads 26 and 28 and 28' to the converters 19 and 19' wherein it is used to demodulate the 50 kc. signal carrier currents supplied to demodulators 19 and 19' from the wide branch filters 10 and 10'. The several audio channels are then separated by audio channel filters 36, 36', 38, 38' and so forth. Each tone appears at the output of both receivers and the best version of each of the tones is selected in the selectors 40, 40' and so forth. Lines 37 and 37' feed the respective outputs of the filters 36 and 36' for channel #1 to selector 40, for example. The selectors 40, 40' and so forth may each in general be similar to that in unit 18. The selected tone output is supplied to a limiter 48 by means of lines 41 and from the limiter 48 to a filter 50 and is then fed to a tone line connected to recording apparatus at a local or remote point. The filter 50 removes unwanted side frequencies produced in the limiter 48 or by diversity switching in unit 40. The recording apparatus may be a telegraph printer or a tone keyer or the like.

When the carrier is phase modulated by the various tone frequencies and both side bands are supplied to the demodulators 19 and 19', the phase of the carrier supplied to the demodulating converter 19 and 19' must be shifted with respect to the side bands for proper operation, as is known in the art. Then a phase shifting network PS is included in the connection between the filter 24 and lines 28 and 28' by moving switch S to the right hand position.

The exalted carrier is also used for automatic frequency control purposes and some carrier output from the filter 24 is supplied to a discriminator and detector circuit in unit 27 wherein a potential is developed which varies with respect to a base potential as the carrier frequency shifts with respect to its correct value. This potential is supplied by lead 29 to an automatic frequency control tube or mechanical means in rectangle 31 to control the frequency of the intermediate frequency oscillator LO'. The discriminator and detector in unit 27 may be of the Seeley or Conrad type or modifications thereof and will not be described in detail herein, since it is well known in the art. The control mechanism in unit 31 may include a reactance tube controlled by the potential developed in 27 or a motor the direction of rotation of which is controlled by said potential. Then the reactance tube may be included in the frequency determining circuits of the oscillator LO'. On the other hand, a motor may be included in unit 31, in which case its direction of rotation is determined by the polarity of the potential out of discriminator 27 with respect to said base potential and the motor derives a reactance in the oscillation generator circuit. The discriminator and detector 27 and control apparatus 31 operate on the generator LO' to stabilize the frequency of the output of IF and IF' in a well known manner.

Common automatic gain control circuits are supplied for the receivers and comprise detectors D and D' in the narrow band units 12 and 12' which are excited by carrier energy to provide across the common load resistor LR a potential which depends on the carrier strength in the two receivers. This potential is supplied by resistor R1 to each of the receivers R and R' to control in a well known manner the bias on the control electrode of one or more amplifier stages therein to regulate or control the strength of the signal supplied at the first intermediate frequency to units IF and IF'. Capacitor C and resistor R1 are so chosen that the gain control action is comparatively fast and the gain of each receiver is controlled in such a manner to supply signals of good strength to the intermediate frequency units IF and IF'.

Figure 2:
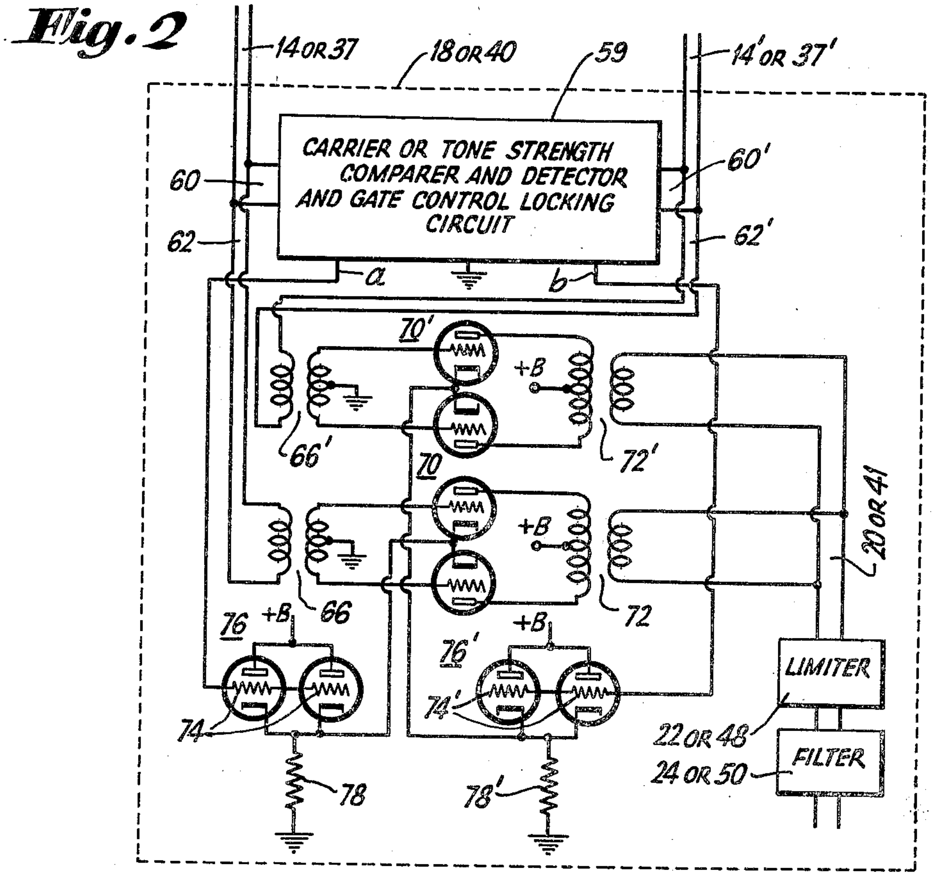

The apparatus in unit 18, as stated above, comprises means for selecting the strongest carrier, means for producing a potential, the polarity of which with respect to a base potential indicates which carrier is strongest, a locking circuit and means operated or controlled by said potential for tripping said locking circuit. The apparatus described in the preceding sentence is included in rectangle 59 of Fig. 2, is substantially as disclosed and claimed in said Schock et al. application and the description thereof will not be repeated herein. The carriers from the two leads 14 and 14′ are supplied to two branches. The branches 60 and 60′ supply this carrier to the said carrier strength sensing and selecting means 59. The branches 62 and 62′ are coupled by transformers 66 and 66′ to amplifying stages or gating stages 70 and 70′ controlled by the output of the locking circuit. In the apparatus included in rectangle 59, the strongest carrier is selected and the locking circuit is controlled to provide potentials at points *a* and *b* which become plus and minus or minus and plus depending upon which carrier is strongest. The carriers supplied by leads 62 and 62′ are fed by transformers 66 and 66′ to the control grids of push pull gating stages 70 and 70′. When these tubes are conductive, the carriers are supplied by transformers 72 and 72′ to output leads 20. The gating stages 70 and 70′ are alternatively conductive so that one carrier only supplies input by the lines 20 to limiter 22. The gate control potentials at points *a* and *b* are fed differentially to the control grids 74 and 74′ of control stages 76 and 76′ each of which includes a pair of electron discharge devices in cathode follower circuits with cathode load resistors 78 and 78′. The cathode end of the resistor 78 is coupled to the cathodes of the tubes in gating stage 70. The cathode end of the resistor 78′ is coupled to the cathodes of the tubes in the gating stage 70′. A point on the secondary winding of transformers 66 and 66′ is grounded thereby completing the grid biasing circuits for the tubes of stages 70 and 70′. Assume that the carrier on leads 14′ is of the best strength and that this carrier is also fed to the leads 62′ and thence by stage 70′, if conductive, to the leads 20 for use. Then the comparer and selector circuit in unit 59 provides at point *b* a negative potential which biases the grids 74′ to cut off so that the tubes of stage 76′ do not draw current. Then the potential at the cathode end of resistor 78′ is nearer ground potential than it would be if current were flowing in these tubes and as a consequence the cathodes of the tubes of stage 70′ are nearer ground potential while the control grids of these tubes are at substantially ground potential and the tubes of stage 70′ are conductive provided the resistor 78′ is of the proper value. The tubes of stage 70′ being conductive, pass the strongest carrier to the line 20 and limiter 22 for use. At the same time, the potential at the point *a* is positive or at least less negative so that the grids 74 are biased in the positive direction and current flows in the tubes of the stage 76 to provide considerable potential drop in the resistor 78 and apply a more positive potential to the cathodes of the tubes of stage 76 and the cathodes of the tubes in the gating stage 70. This is the same as making the control grids of the tubes of the gating stage 70 more negative and this stage is biased to cut off so that the poorer carrier is blocked and is not used in the carrier exalted demodulators 19 and 19′.

The apparatus in unit 40 may be similar to this apparatus illustrated in Fig. 2 with changes in circuit elements and constants sufficient to make the circuits appropriate for the frequencies used at the output of the audio channel filters 36, 36′ and so forth. There is then no need of illustrating the apparatus in unit 40, since the nature thereof will be clear to those skilled in the art.

Figure 3:
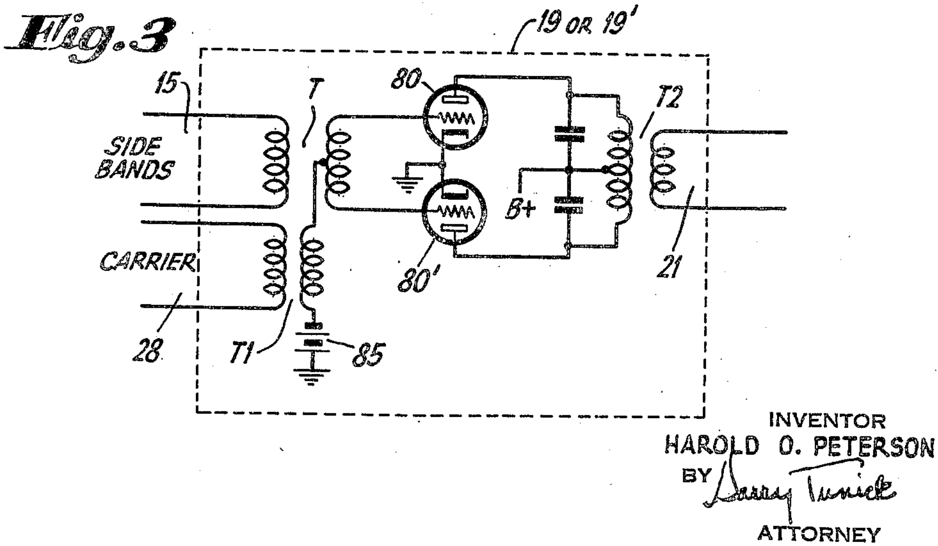
Fig. 3 illustrates a converting detector appropriate for use in the rectangle 19 and 19' of Fig. 1.

The balanced detectors in units 19 and 19′ may be as illustrated in Fig. 3 of the drawings. The detector in unit 19 will be described. The side bands and weak carrier are supplied from unit 10 by leads 15 to the primary winding of a transformer T, the secondary winding of which couples the control grids of a pair of electron discharge devices 80 and 80′ in push pull relation. The exalted carrier from the narrow filter 24 is supplied by leads 26 and 28 to the primary winding of a second transformer T1, the secondary winding of which is connected to a point on the secondary winding of transformer T to impress the selected carrier (the best carrier) co-phasally on the control grids of tubes 80 and 80′. The secondary winding of transformer T1 and its connection also serves as a grid bias circuit for the control grids of tubes 80 and 80′ and includes the necessary bias source 85 in the connection between the grids and ground. The cathodes of the tubes 80 and 80′ are grounded to complete this circuit. The carrier is suppressed in the differential output circuit including transformer T2 and the modulation components appear in the secondary winding thereof and are fed by leads 21 to the channel filters, two of which are shown in each detector output and designated 36, 36′, 38, 38′ and so forth.

Figure 4:
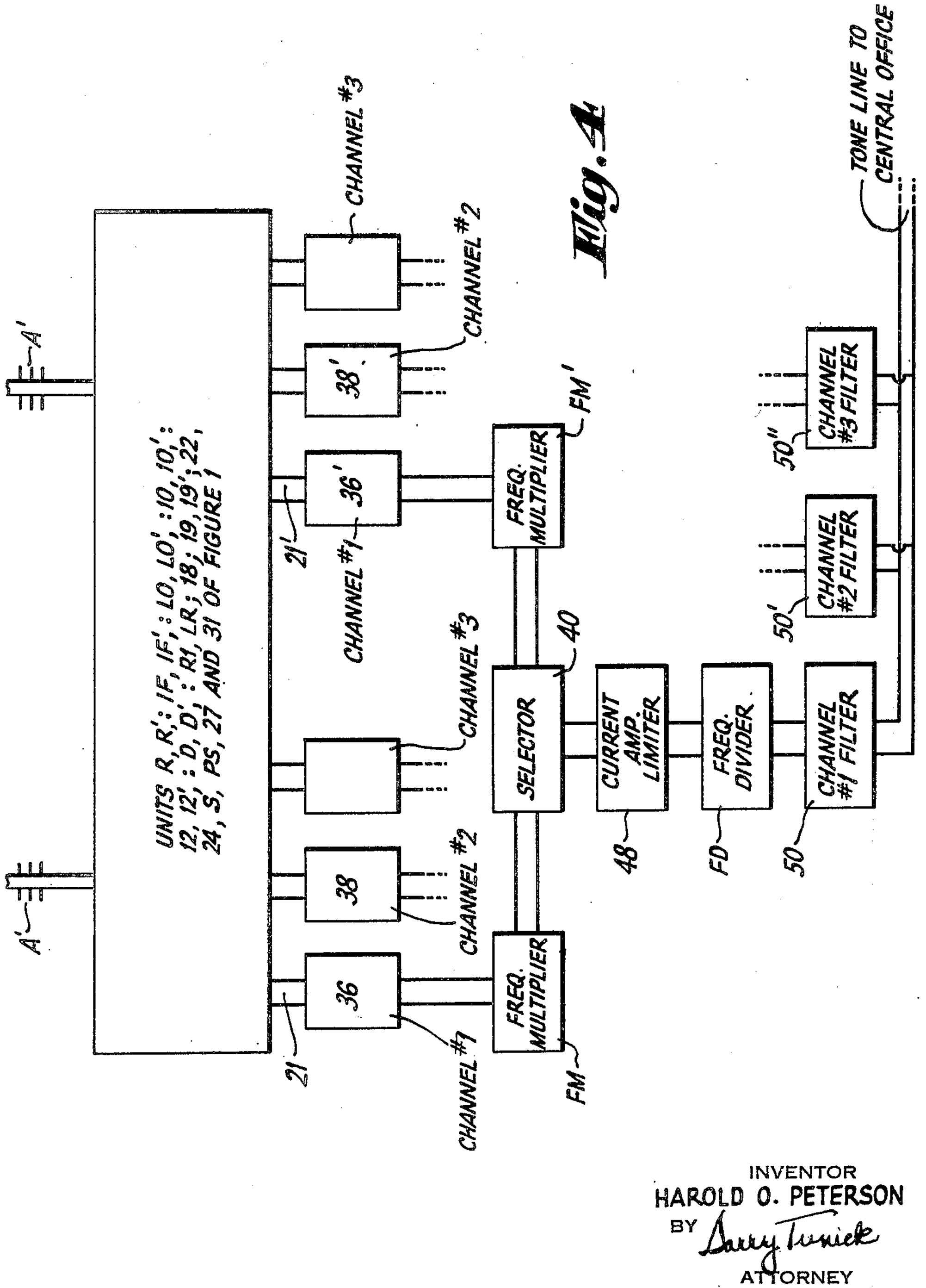
Fig. 4 is a modification of the arrangement of Fig. 1.

The embodiment of Fig. 4 is similar to the embodiment of Fig. 1 except for these differences. It may be desirable in some cases to operate the selecting apparatus in unit 40 at higher than audible frequency, in order that the time constants of the circuits involved need not be slowed up too much by virtue of the large capacitor and reactor elements necessary at the low frequencies. Then a frequency multiplier FM is included in the leads between the units 36 and 40 and a frequency multiplier FM′ in the leads between 36′ and 40 so that the frequency shifted audio tones may be multiplied up to the desired frequency before selection takes place. Then a selected tone is divided down by frequency dividing circuits FD inserted between the limiter 48 and the filter 50. The multiplying and dividing circuits may be conventional and details of the same have not been shown herein.

There is a selector 40 for each channel in Fig. 1 and in Fig. 4. These selectors then select the best tone on each channel and the selected tone after limiting at 48, 48′, 48″, etc., is filtered at 50, 50′, 50″, etc. and fed over tone lines to the point at which it is used. In the embodiment of Fig. 4, the tones are raised in frequency before selection and reduced in frequency after selection and limiting.

What is claimed is:

1. In receiving apparatus for selecting the best of several received versions of the same signal, each of which versions comprises a carrier which has been modulated at the transmitter by signals, means for extracting from each version substantially only the carrier, means for comparing the strengths of the several extracted carriers and for selecting for use the strongest of the several extracted carriers, and a detector for each version excited thereby and by the selected carrier.

2. Apparatus as recited in claim 1 including means coupled to the detectors to select signal output from that detector supplying the strongest signal output.

3. Apparatus for demodulating a plurality of versions of a signal, each of which versions comprises carrier current and side band energy comprising in combination, a detector for each version of said signal, means for impressing the carrier current and side band energy of each version of said signal on its detector, means for selecting the strongest unmodulated carrier of said several versions of said signal, and means for impressing the said selected carrier on all of said detectors.

4. A system as recited in claim 3 including other apparatus for comparing the strength of the detected signals and selecting the strongest signal.

5. In an exalted carrier diversity system, a plurality of receivers each comprising means for generating currents representing side band and carrier energy resulting from modulation of a carrier by signals, means in each receiver coupled with said last named means for separating currents representing the unmodulated carrier energy from each of said representative currents, carrier energy strength comparing and selecting means excited by the separate unmodulated carriers for selecting the strongest carrier, a detector coupled to each receiver, and means for feeding the selected carrier to all of said detectors.

6. In an exalted carrier diversity system, a plurality of receivers each comprising means for generating currents representing side band and carrier energy resulting from modulation of carrier by a plurality of signal modulated tones, means in each receiver coupled with said last named means for separating currents representing the unmodulated carrier energy from each of said representative currents, carrier energy strength comparing and selecting means excited by the separate unmodulated carriers for selecting the strongest carrier, a converter coupled to each receiver, means for feeding the selected carrier to all of said converters, and a plurality of filters one for each tone coupled to said converter.

7. In an exalted carrier diversity system, a plurality of receivers each comprising means for generating currents representing side band and carrier energy resulting from modulation of a main carrier by a plurality of signal modulated sub-carriers, means in each receiver coupled with said last named means for separating currents representing the unmodulated carrier energy from each of said representative currents, carrier current strength comparing and selecting means excited by the several separate unmodulated carriers for selecting the strongest carrier, a converter in each receiver excited by the currents generated therein, means for feeding the selected carrier to all of said converters, a plurality of filters connected to each converter there being corresponding filters one for each sub-carrier coupled to each converter, and means for selecting sub-carrier energy from that filter of the corresponding filters wherein the sub-carrier is of best strength.

8. In an exalted carrier diversity system, a plurality of receivers each comprising means for generating currents representing side band and carrier energy resulting from modulation of a carrier by signals, means in each of said receivers for separating currents representing the unmodulated carrier energy from each of said representative currents, a detecting system excited by the separate unmodulated carrier currents for comparing the strength thereof and producing a potential the magnitude of which depends on which of the unmodulated currents representing the carriers is strongest, a gating system including a valve in each receiver excited by the corresponding unmodulated carrier in each receiver, means for controlling the conductivity of said valves by said produced potential to pass the strongest carrier only, a detector for each receiver, and connections between said valves and all of the detectors for feeding the selected unmodulated carrier to all of said detectors.

9. In an exalted carrier diversity system, a plurality of receivers each comprising resonating circuits for generating currents representing side band and carrier energy resulting from modulation of a main carrier by a plurality of sub-carriers each in turn modulated by signals, a carrier filter in each receiver for separating from said currents, currents representing the main unmodulated carrier, carrier strength comparing detectors coupled to each of said filters for selecting the strongest unmodulated carrier, a converter in each receiver, connections between said carrier strength comparing detectors and the converter in each receiver for supplying thereto the strongest unmodulated carrier, and a plurality of filter circuits coupled to each said last named converters, there being a filter circuit for each of the sub-carriers used to modulate the main carrier.

10. In an exalted carrier diversity system, a plurality of receivers each comprising means for generating currents representing side band and carrier energy resulting from modulation of a carrier by a plurality of signal modulated tones, means in each of said receivers for separating currents representing the unmodulated carrier energy from each of said representative currents, a detecting system excited by the separate unmodulated carrier currents for comparing the strength thereof and producing a potential the magnitude of which depends on which of the currents representing the carriers is strongest, a gating system including a valve in each receiver excited by the corresponding unmodulated carrier in each receiver, means for controlling the conductivity of said valves by said produced potential to pass the strongest carrier only, a detector for each receiver excited by the representative current generated therein, connections between said valves and all of the detectors for feeding the selected unmodulated carrier to all of said detectors, a filter for each modulated tone coupled to each detector, and means for selecting output from that one of the filters which has the strongest tone.

HAROLD O. PETERSON.

REFERENCES CITED

The following references are of record in the file of this patent:

UNITED STATES PATENTS

| Number | Name | Date |
|---|---|---|
| 2,121,103 | Seeley | June 21, 1938 |
| 2,203,857 | Beers | June 11, 1940 |
| 2,233,183 | Roder | Feb. 25, 1941 |
| 2,249,425 | Hansell | July 15, 1941 |
| 2,253,867 | Peterson | Aug. 26, 1941 |
| 2,306,687 | Cox | Dec. 29, 1942 |
| 2,309,678 | Smith | Feb. 2, 1943 |
| 2,383,126 | Hollingsworth | Aug. 21, 1945 |
| 2,384,456 | Davey | Sept. 11, 1945 |